(12) United States Patent
do Amaral Assy et al.

(10) Patent No.: US 11,582,898 B2
(45) Date of Patent: Feb. 21, 2023

(54) METERS FOR FERTILIZERS, SMALL SEEDS, AND CHEMICAL PRODUCTS, AND RELATED SYSTEMS AND METHODS

(71) Applicant: José Roberto do Amaral Assy, Caldas Novas (BR)

(72) Inventors: José Roberto do Amaral Assy, Caldas Novas (BR); Antonio Miguel Hernandez Gonzalez Gomez, Sao Paulo (BR); Bruno César Oliveira Milagres, Sao Paulo (BR); Frederik Oest Moller, Sao Paulo (BR); Ricardo Araujo Pereira, Guarulhos (BR)

(73) Assignee: Jose Roberto do Amaral Assy, Caldas Novas (BR)

( * ) Notice: Subject to any disclaimer, the term of this patent is extended or adjusted under 35 U.S.C. 154(b) by 246 days.

(21) Appl. No.: 16/863,985

(22) Filed: Apr. 30, 2020

(65) Prior Publication Data

US 2020/0253108 A1    Aug. 13, 2020

Related U.S. Application Data

(62) Division of application No. 15/941,688, filed on Mar. 30, 2018, now abandoned.

(51) Int. Cl.
*A01C 7/10* (2006.01)
*A01C 15/08* (2006.01)
*A01C 7/16* (2006.01)

(52) U.S. Cl.
CPC ............... *A01C 7/105* (2013.01); *A01C 7/16* (2013.01); *A01C 15/08* (2013.01)

(58) Field of Classification Search
CPC .......... A01C 7/105; A01C 7/16; A01C 15/08; A01C 7/102; A01C 7/10; A01C 7/08; A01C 7/00; A01C 15/06; A01C 15/00
See application file for complete search history.

(56) References Cited

U.S. PATENT DOCUMENTS

| 6,244,301 B1 | 6/2001 | Scott et al. |
| 2014/0159846 A1 | 6/2014 | Kramer |
| 2015/0208573 A1 | 7/2015 | Stevenson |

FOREIGN PATENT DOCUMENTS

| BR | PI 0400933-9 A | 11/2005 |
| BR | PI 0402211-4 | 1/2006 |
| BR | 8602761-1 U | 4/2008 |
| EP | 1 382 236 B2 | 1/2004 |

*Primary Examiner* — Christopher J. Novosad
(74) *Attorney, Agent, or Firm* — Greenberg Traurig, LLP

(57) ABSTRACT

Meters for fertilizers, small seeds, and chemicals include a housing defining a loading chamber, a rotatable metering disk provided with a receiving surface and a discharge surface, the disk including metering orifices; a ring including a discharge opening, and an insulating barrier arranged in the interior of the housing, the insulation barrier forming an insulating chamber on the rotatable disk and defining an inlet region of the disk and an output region of the disk; a metering bulkhead associated with the insulating barrier in the inlet region of the rotating disk with metering orifices loaded, the metering bulkhead being arranged on the rotatable metering disk so that a lower portion of the metering bulkhead is coplanar to the receiving surface of the rotatable disk.

4 Claims, 18 Drawing Sheets

METERS FOR FERTILIZERS, SMALL SEEDS, AND CHEMICAL PRODUCTS, AND RELATED SYSTEMS AND METHODS

CROSS-REFERENCE TO RELATED APPLICATION

This application is a divisional of U.S. patent application Ser. No. 15/941,688, titled "METERS FOR FERTILIZERS, SMALL SEEDS, AND CHEMICAL PRODUCTS AND RELATED SYSTEMS AND METHODS," filed Mar. 30, 2018, the entire disclosure of which is incorporated herein by this reference.

FIELD

The present disclosure relates to meters applied in agricultural machines and implements. Some embodiments relate to meters for fertilizer, small seeds and chemical products applied in seeder-fertilizers, planter-fertilizers, and chemical corrective distributors.

BACKGROUND

The agricultural sector is one of the main economic bases of a country, for this reason there is a constant search for an increase in productivity, aiming at the lowest environmental impact and also to the reduction of crop production expenses.

The application of fertilizers and other products for treatment of the soil is directly related to the factors that influence agricultural productivity, since, among other factors, the correct metering of these materials in kilograms per hectare ensures greater productive capacity and provides savings of the material, which directly impacts the reduction of the expenses with supplies and, therefore, the total cost of the crop.

Some known agricultural implements used in the current market for the metering of granular supplies employ endless screw meters. This type of solution is functional and widely disseminated, including by patent documents.

In the Brazilian Utility Model patent document MU 8602761-1, a fertilizer meter with a helical actuator is disclosed, in which the discharge is obtained by gravity. In such a model, the fertilizer is metered from the rotational movement of the helical actuator, in which the metering of material is generally accomplished by adjusting the speed of rotation of the actuator. The rotation of the helical actuator is driven by a powered wheel of the agricultural implement.

In this type of device, the granules are transported through the valleys of the helical actuator and fall by gravity in a conductor disposed at an end of the helical actuator. The major disadvantage in this type of product is the metering intermittence resulting from the fact that the grains are transported in the valley of the helical actuator, therefore the intermittency is directly related to the interval given by the periods between the valleys of the helix, i.e., the thread pitch defines the intermittent input of the driver.

With the intent of minimizing intermittency, the product disclosed in Brazilian Patent 0402211-4 presents a solution which still uses a helix, but additionally has a physical overflow barrier, arranged after the helix and before the conductor, through which the particles of fertilizer are forced to overflow to reach the exit orifice.

Although this solution reduces intermittent metering, it is still not a completely satisfactory solution, since homogeneity only occurs in ideal terrain conditions, i.e., only in flat terrains with no slopes and/or uneven relief. More specifically, in the case of longitudinal slopes of the agricultural implement, variation in the mass of distributed fertilizer is observed, where in an upward slope there is an increase in the mass of metered input and in a downward slope a reduction occurs.

One of the alternatives for resolving the intermittence and reducing the metering heterogeneity due to soil topography is found in the Brazilian patent application PI 0400933-9, which discloses a system that uses the same overflow barrier principle, this being, however, disposed laterally with respect to the helix.

More specifically, the lateral overflow causes the mass variation metered due to longitudinal upward and downward slopes being reduced, however variations of lateral slope of the agricultural implement continue to generate heterogeneity in the distribution.

In the master dissertation of Gustavo José Bonotto, entitled "*Desempenho de Dosadores de Fertilizantes de Semeadoras-Adubadoras em Linha*", defended in 2012 for the post-graduate program in Agricultural Engineering at the Universidade Federal de Santa Maria, the performance of five different types of fertilizer meters are evaluated, namely: endless screw meter with discharge by transverse overflow; endless screw meter with discharge by gravity; endless screw meter with lateral discharge and overflow; ribbed rotor meter, and star disk meter.

In the evaluation, two of the tests performed were on the performance analysis for longitudinal and lateral inclinations of the devices. In the tests of metered mass measurement as a function of the longitudinal inclination of the meter, the endless screw meter with discharge by gravity presented the worst performance, having a coefficient of variation of 17.44%, followed by the transverse overflow meter of 9.35% and lateral overflow at 7.22%. Following the same reasoning, but in the evaluation of lateral slopes, the endless screw meter with lateral discharge presented the worst coefficient of variation in the value of 2.28% followed by the meter with discharge by gravity 1.28% and transversal overflow 1.17%.

Patent documents are also known which disclose alternative solutions to systems that use endless screw such as, for example, US20150208573 and EP1382236.

The patent application US20150208573 discloses a mechanism used in agricultural equipment for the dispersion of granular chemicals with the use of an axially rotatable cylinder with transverse metering apertures. Such configuration provides a significant improvement in relation to homogeneity in the distribution of granular materials, even on uneven terrains.

In spite of the improvement in relation to the intermittent metering and consequent reduction of the heterogeneity in the distribution of products during the application in terrains with irregular topographies, the metering device of document US20150208573 still has the drawback of not guaranteeing a precise metering and therefore making impossible an effective control of the mass of distributed fertilizer.

In addition, in US20150208573, configurations of the shapes of the metering openings that provide non-clogging are described. However, the constructive improvements in the apertures disclosed in US20150208573, in addition to not ensuring metering accuracy, still do not prevent the inlaying of the material to be metered in the inner walls of the apertures, since the exit of the material is conditioned only by the action of gravity.

Patent EP1382236 describes methods and devices for dispersing chemical materials, especially materials for agricultural treatments. To this end, the dispersing device has a container combined with a disperser, wherein the disperser comprises a horizontal rotatable metering disk with a plurality of channels defining predefined spaces corresponding to a predetermined volume of material for each space.

Similarly to US20150208573, the document EP1382236 also provides an improvement in relation to the homogeneity of the metering by not using endless screw metering systems and having predefined metering spaces intended for metering.

At the same time, the disclosure in EP1382236 also has the same drawbacks of not guaranteeing an accuracy that is capable of effective control of material to be distributed, since it does not provide means to ensure that the predefined volume is satisfactorily filled and that these volumes are completely emptied by, again, relying solely on the action of the gravity.

It should therefore be made clear that, although apparently functional up to the present time, the meters of fertilizers, small seeds, and chemicals, especially those used in the agricultural field, have certain drawbacks and limitations mainly related to the accuracy of the metering, as well as in relation to the control of material distributed by area.

BRIEF SUMMARY

In some embodiments, the present disclosure includes a meter for fertilizer, small seeds, and chemicals that includes: a housing defined by a base; a side wall portion and an upper inlet portion, the housing defining a loading chamber; a rotating metering disk comprising a receiving surface and a discharge surface, the disk comprising metering orifices passing from the receiving surface to the discharge surface; a ring comprising a discharge opening; an insulation barrier disposed on the interior of the housing, the insulation barrier forming an insulation chamber over the rotatable metering disk and defining an inlet region of the rotatable metering disk to the loading of the metering orifices and a rotatable metering disk output region for the discharging of the metering orifices; and a metering bulkhead associated with the insulation barrier, in the inlet region of the rotatable metering disk with the metering orifices loaded, the metering bulkhead being disposed on the rotatable metering disk such that a lower portion of the metering bulkhead is coplanar to the receiving surface of the rotatable metering disk.

According to some embodiments of the present disclosure, the following characteristics, and possible variants thereof, may also be present, alone or in combination: the orifices of the rotatable metering disk may be disposed in at least one radial row distributed equidistant from each other; the orifices may be oblong; the orifices may be circular; the orifices may be arranged to form regions of interference between adjacent orifices; the metering bulkhead may be interchangeable; the metering bulkhead may be made of rigid material; the metering bulkhead may be made of flexible material, the flexible material being a polymer or spring steel; an anti-skip bulkhead may be included and arranged adjacent the metering bulkhead; the ring may be formed of at least two superimposed layers, the lower layer of polymeric material and the upper layer of a material resistant to abrasion, such as stainless steel; and/or an ejector may be included and disposed inside the insulation chamber, such that: in one embodiment the ejector may present complementary projections to the orifices of the metering disk; and in another embodiment the ejector may have flexible bristles.

The present disclosure also provides, in some embodiments, a method of metering for a meter for fertilizer, small seed and chemicals, wherein the meter comprises: a housing comprising a loading chamber and an insulation chamber; a rotating disk comprising a receiving surface and a discharge surface, the disk comprising metering orifices passing from the receiving surface to the discharge surface; a metering bulkhead arranged over the rotatable metering disk so that a lower portion of the metering bulkhead is coplanar to the receiving surface of the rotatable metering disk; the method comprising the steps of: receiving an input in the loading chamber; filling, on the side of the receiving surface of the disk, at least one metering orifice with the input; rotating the disk in the direction and until the at least one filled metering orifice passes through the metering bulkhead; and emptying, inside of the insulation chamber and through the side of the discharge surface of the disc, at least one metering orifice that passed through the metering bulkhead. In addition, in the emptying step, at least one orifice can be accomplished with the aid of an ejector disposed inside the insulation chamber.

In a still further embodiment, the disclosure relates to a metering monitoring system for fertilizers, small seeds and chemicals that comprise: a metering means with a predefined volume; a metering sensor arranged on a receiving surface of the rotatable metering disk and after a metering bulkhead in the direction of movement of the metering means; and a circuit associated with the metering sensor, the circuit comprising data processing and transmission means.

The metering means with predefined volume may include: a rotatable metering disk comprising a receiving surface and a discharge surface, the rotatable metering disk comprising metering orifices with predetermined volumes, wherein the metering orifices passes from the receiving surface to the discharge surface; an insulation chamber arranged on at least a portion of the rotatable metering disk and defining an inlet region of the rotatable metering disk for the loading of the metering orifices and an outlet region of the disk for discharging of the metering orifices; a metering bulkhead associated with the inlet region of the rotatable metering disk of the insulation chamber, the bulkhead being arranged over the rotatable metering disk such that a lower portion of the metering bulkhead is coplanar to the receiving surface of the rotatable metering disk.

Also, in some embodiments of the present disclosure, the metering sensor may be any one of an optical sensor, ultrasound sensor, microwave sensor, capacitive sensor, proximity sensor, contact sensor or any other that allows detection of a volume inside the metering orifices.

The present disclosure, in some embodiments, also includes a method of monitoring the metering of fertilizers, small seeds, and chemicals, in a system that comprises: a metering means with a predefined volume; a metering bulkhead arranged on the metering means so as to delimit the maximum height of the material surface to be metered; a metering sensor arranged over the receiving surface of material of metering means and after a metering bulkhead in the movement direction of the metering means; and a circuit associated with the metering sensor, the circuit comprising data processing and transmission means; the method further comprising the steps of: monitoring, through the metering sensor, the material receiving surface of the metering means; generating a status signal of the metering means; processing a status signal of the metering means; transmitting the status signal of the metering means to a monitoring and control center.

The step of generating a status signal of the metering means may include generating a signal representative of the volumetric proportion within the metering means. In some embodiments, the metering means with a predefined volume includes: a rotating disk comprising a receiving surface and a discharge surface, the disk comprising metering orifices passing from the receiving surface to the discharge surface; an insulation chamber arranged on at least a portion of the rotatable metering disk and defining an inlet region of the rotatable metering disk with the loaded metering orifices and a rotatable metering disk output region with the discharged metering orifices.

Also, in some embodiments, the present disclosure includes a clogging monitoring system in an output of a meter for fertilizer, small seed and chemicals that includes: a housing defined by a base, a side wall portion, and an upper inlet portion, the housing defining a loading chamber; a means of material metering received in the loading chamber; a discharge nozzle comprising an upper aperture of metered material receiving, a lower aperture of metered material delivery and an overflow aperture; a closure cap of the overflow aperture associated with the discharge nozzle; a clogging sensor associated with the closing cap of the overflow aperture; and a circuit associated with the clogging sensor, the circuit comprising data processing and transmission means.

Some embodiments of the present disclosure relate to a monitoring method of clogging in an output of a meter for fertilizer, small seed and chemicals in a system, including: a discharge nozzle comprising an upper aperture of metered material receiving, a lower aperture of metered material delivery and an overflow aperture; a closure cap of the overflow aperture associated with the discharge nozzle; a clogging sensor associated with the closing cap of the overflow aperture; and a clogging circuit associated with the clogging sensor, the circuit comprising processing and data transmission means. The method may further include the steps of: monitoring, through the clogging sensor, the status of the closure cap of the overflow aperture; generating a status signal of the closure cap of the overflow aperture; processing a status signal of the closure cap of the overflow aperture; and transmitting the status signal of the cap to a monitoring and control center.

Further, some embodiments of the present disclosure relate to a maintenance system for a meter for fertilizer, small seed and chemical, including: a housing defined by a base, a side wall portion, and an upper inlet portion, the housing defining a loading chamber; a counterbase associated to the housing by at least one fixation mechanism; and at least one closure mechanism of the loading chamber.

Optionally, the fixation mechanism may be formed by two ears including oblong apertures arranged in the housing; at least one shoulder in the counterbase comprising an aperture; and a rod passing through the apertures of the housing and of the counterbase.

Furthermore, the at least one closure mechanism of the loading chamber may include of at least one mounting drawer moving plate.

The present disclosure also includes a meter system for fertilizer, small seeds and chemicals including a meter with the characteristics described above and, in addition, a density gauge that includes a predetermined volume housing and at least one loading cell.

In some embodiments, the density gauge is integrated to the inlet region of the meter and is associated with a processing and metering control center.

BRIEF DESCRIPTION OF THE DRAWINGS

The present disclosure will be better understood from the following description with respect to particular embodiments, which make reference to the attached figures.

DETAILED DESCRIPTION

The present disclosure will now be described with respect to certain embodiments, making reference to the attached figures. In the following figures and description, similar or corresponding parts may be marked with the same or similar reference numbers.

The figures are schematic, and their dimensions and proportions are exemplary in that they aim only to describe the disclosure in a manner to facilitate understanding and not to impose any limitations other than those defined by the attached claims.

It must be recognized that the different teachings of the embodiments discussed below may be employed separately or in any suitable combination to produce the same desired results.

Some embodiments of the present disclosure were initially developed for the metering of fertilizer, but in laboratory tests it was verified that, besides the functioning in the metering of fertilizers, it also has excellent functioning for metering of small seeds and particulate/granulated chemicals for soil treatment, such as, for example pesticides, herbicides, and fungicides. In this way it should be understood that the descriptions referring to the material to be metered will be referred to as "material to be metered" or simply "material" or "input" to facilitate description and understanding and should not be considered restrictively.

Figure 1:
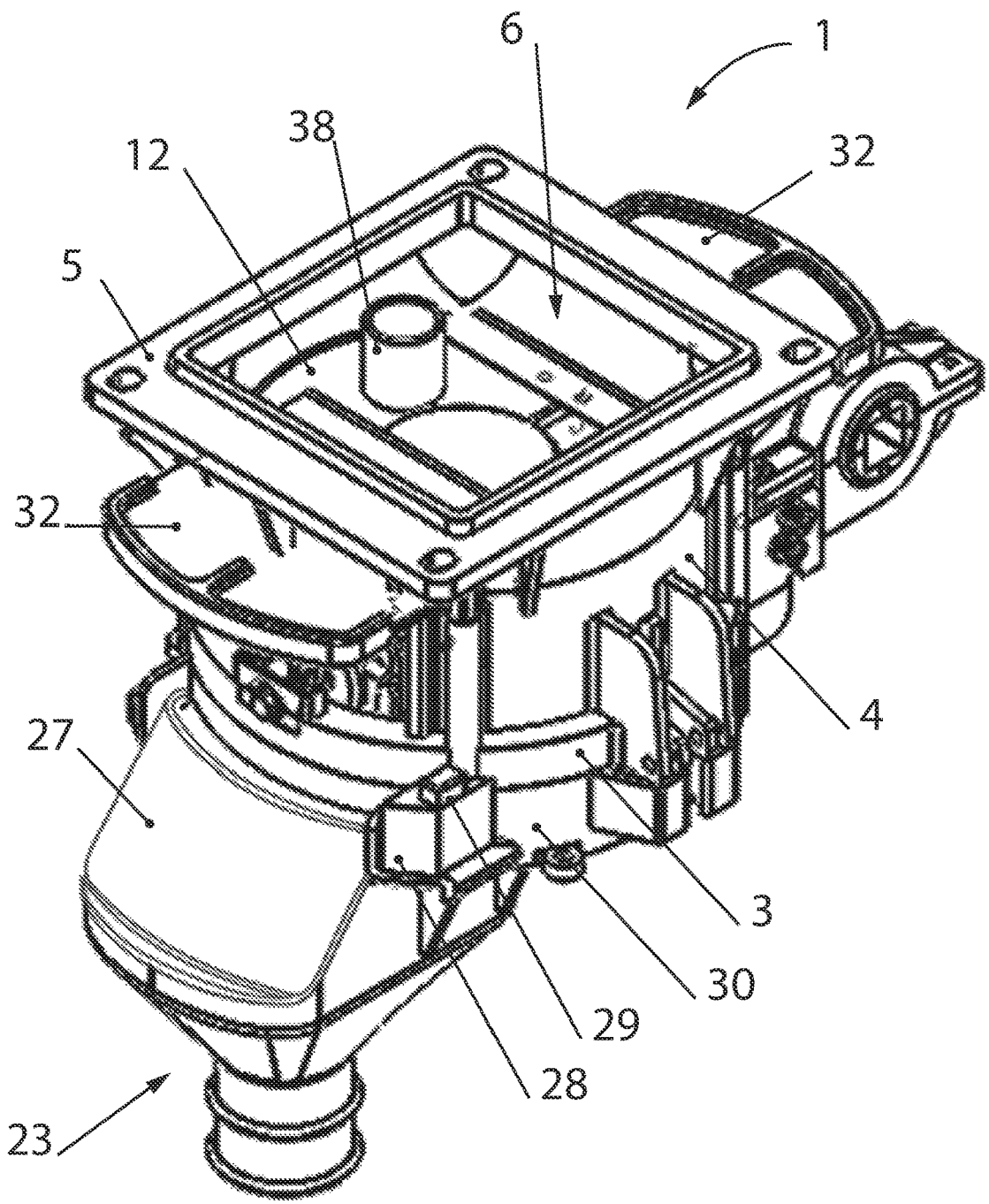
FIG. 1 shows a perspective view of an embodiment of the disclosure.

FIG. 1 illustrates a perspective view of an embodiment of the meter 1 of the disclosure in an arrangement mounted in a functioning configuration. In this configuration a reservoir (not illustrated) is coupled to the upper inlet portion 5, whereby the material to be metered is inserted into the loading chamber 6.

Figure 10:
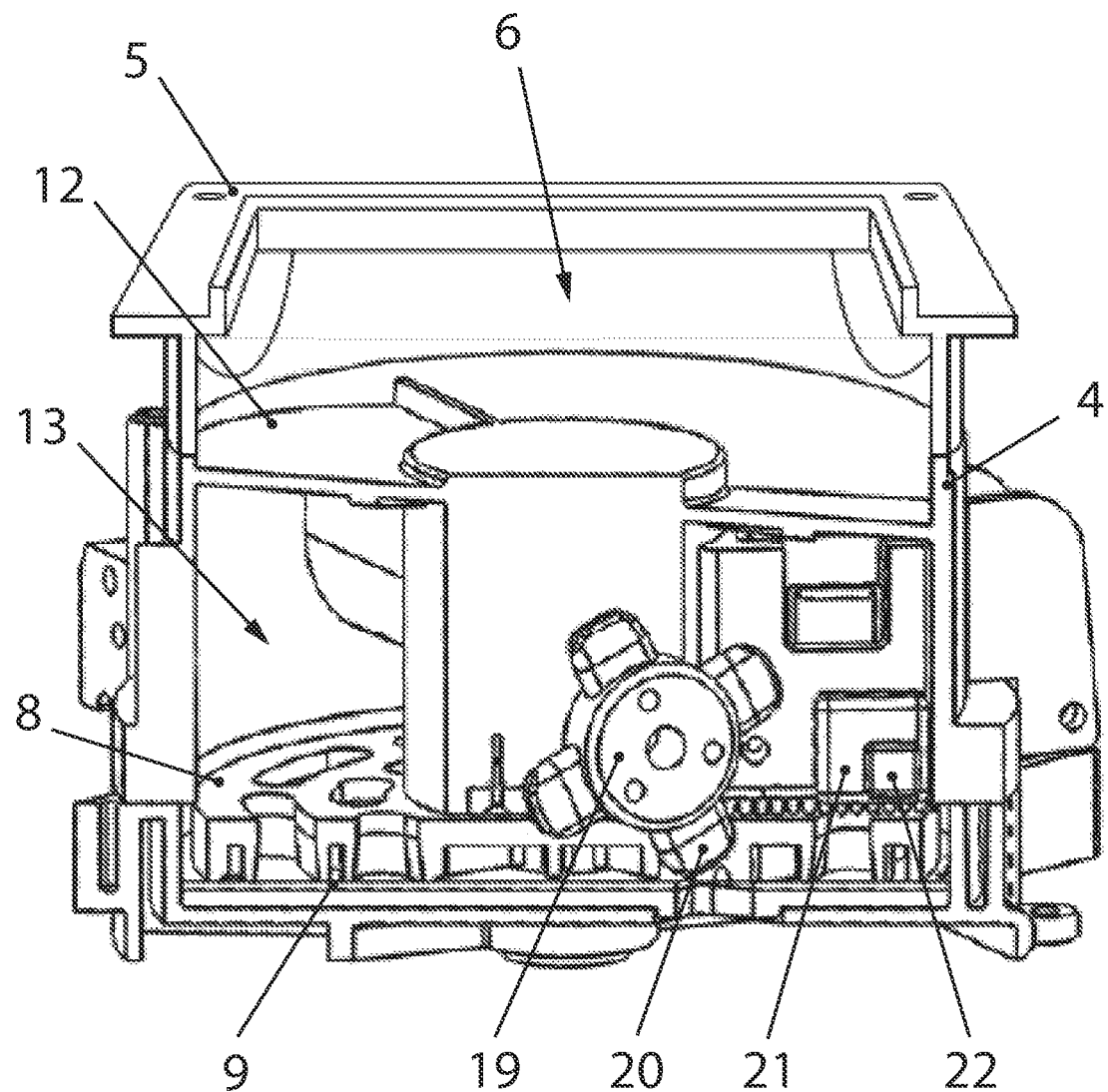
FIG. 10 shows a side view of an embodiment of the meter in cut illustrating the interior of the insulation chamber and the loading chamber.

Still referring to FIG. 1 and, in cross-sectional view in FIG. 10, it can be observed that the loading chamber 6 may be laterally defined by a side wall portion 4, in this embodiment shown in a cylindrical configuration, and at its bottom by an insulation barrier 12.

Figure 18:
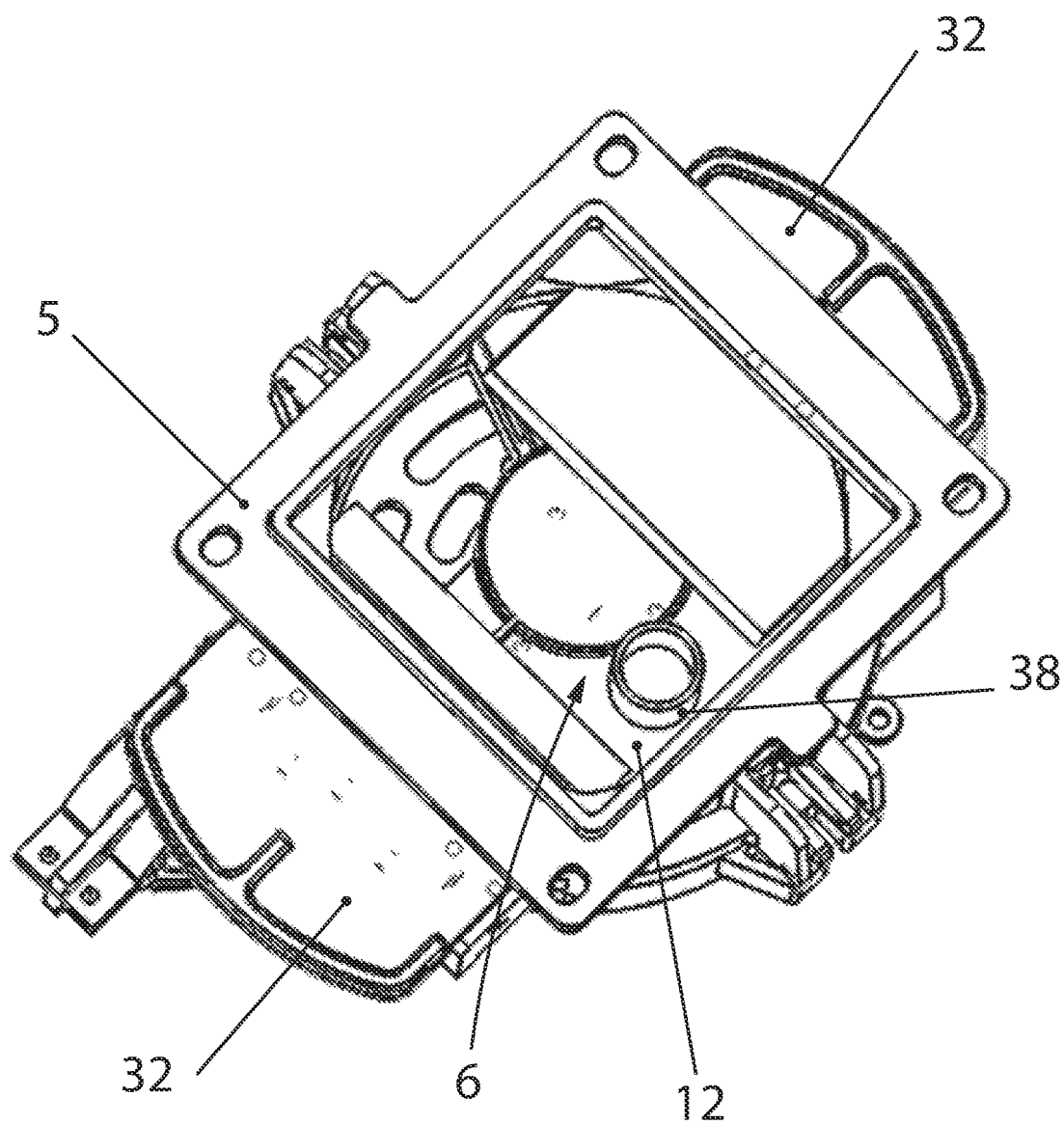
FIG. 18 shows a top view of an embodiment of the disclosure.

Also, in FIGS. 1 and 18, there can be seen an embodiment of the disclosure, in which a density gauge 38 is arranged within the loading chamber 6.

The density gauge 38 may include a pre-defined volume container and load cells within the container, wherein the operation of the density gauge 38 consists of periodically collecting material into the container until reaching full volume and measuring the mass of material contained in the container, then calculating the density of the material and sending the calculated value to a processing and control center, which in turn automatically adjusts the metering of material at the exit of the meter 1. After sending the value of density to the processing and control center the density gauge 38 may be emptied and the previous cycle may be repeated.

Alternatively, the density gauge 38 may be physically decoupled from the meter, but still maintaining a remote communication to send a signal to the processing and control center relative to the density of the material to be metered. In this case, the measurement may be made manually by an operator and the signal relative to the density of the material can be sent automatically or manually to the processing and control center.

Figure 2:
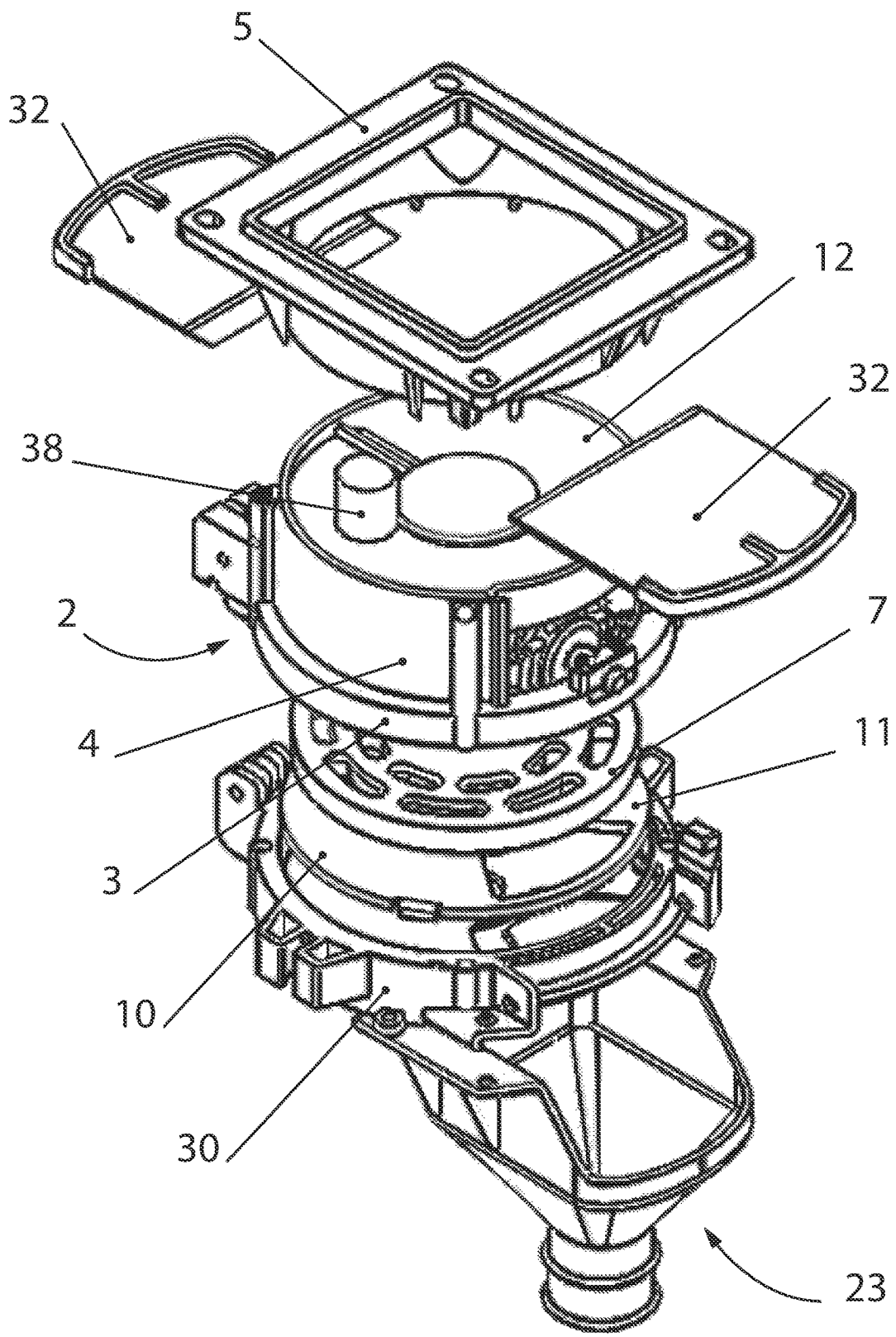
FIG. 2 shows an exploded view of an embodiment of the disclosure.

FIG. 2 shows an embodiment of the meter 1 of the present disclosure in exploded view. In this figure, the association relationship between the elements of meter 1 is well illustrated, the association being given from top to bottom by upper portion of inlet 5, closure mechanism 32, insulation barrier 12, housing 2 (associated with base 3 and separated from upper inlet portion 5), metering rotatable metering disk 7, ring 10, counterbase 30, and discharge nozzle 23.

Figure 3:
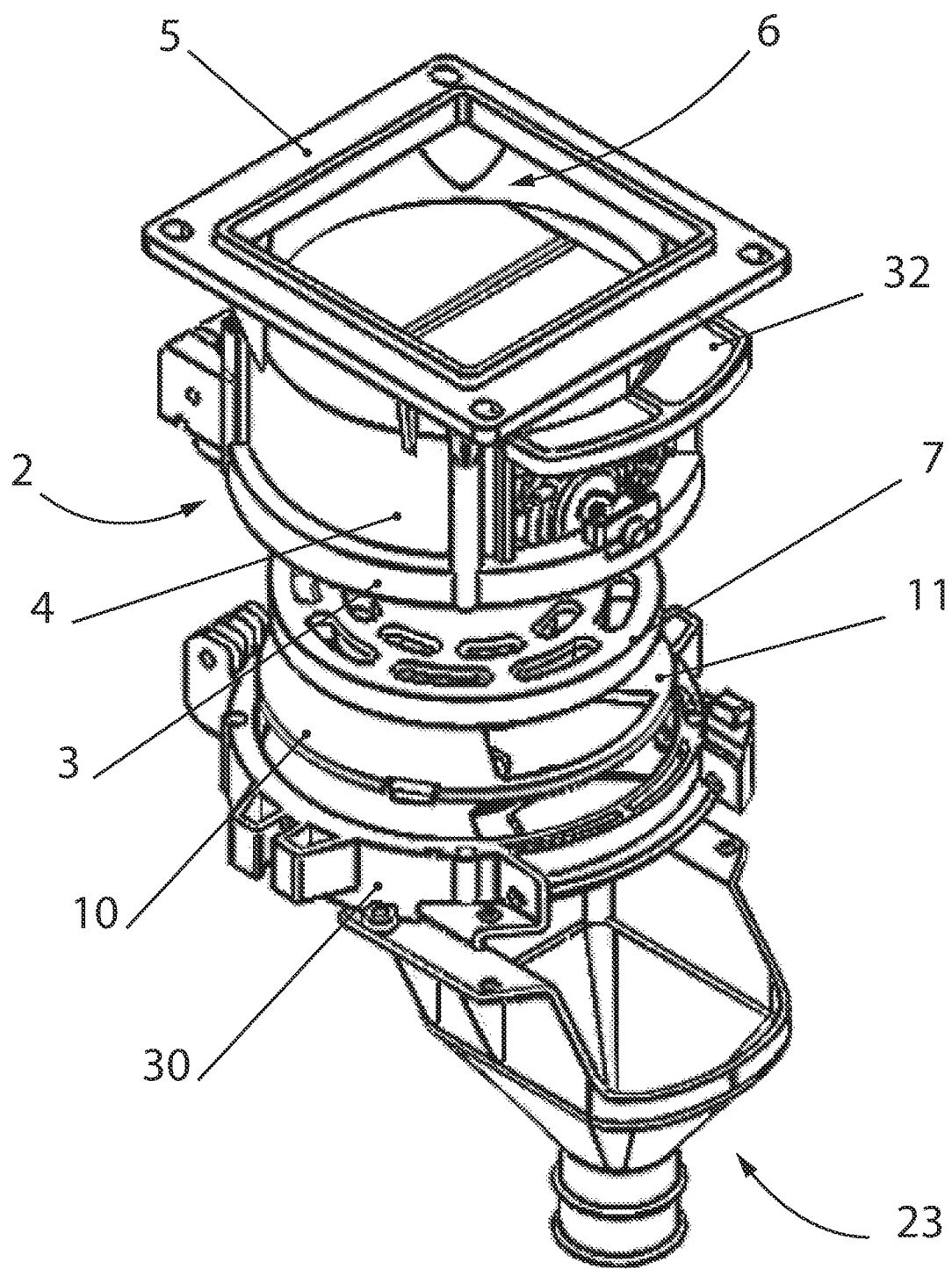
FIG. 3 shows an exploded view of an embodiment of the disclosure.

FIG. 3 illustrates, in exploded view, an embodiment of the disclosure where the housing 2 is illustrated in its assembled form, i.e., base 3, side wall portion 4, and the upper inlet portion 5 are illustrated as assembled.

Figure 4:
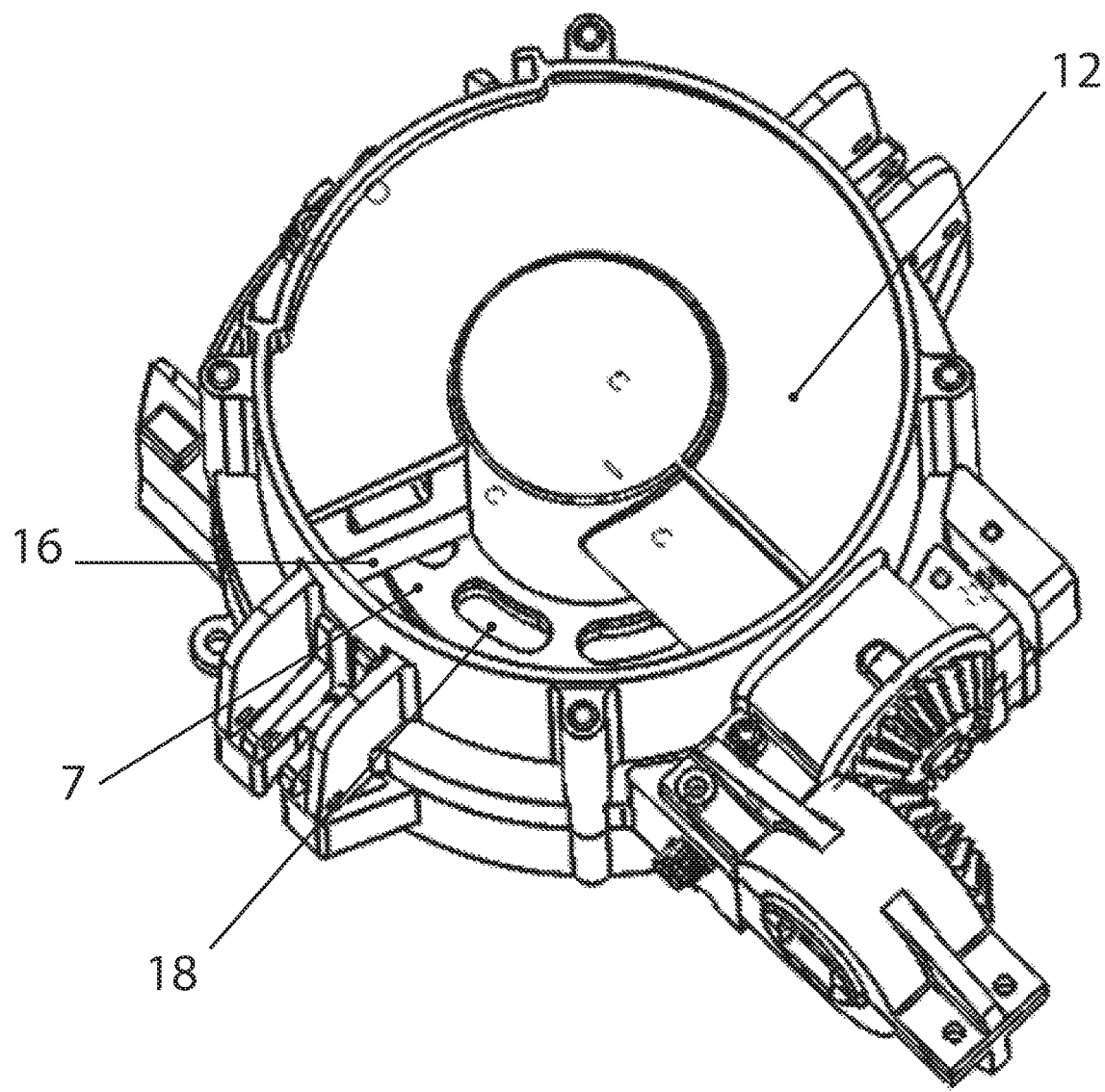
FIG. 4 shows a top view of an embodiment of the meter with an axial cut above the insulation barrier.
Figure 5:
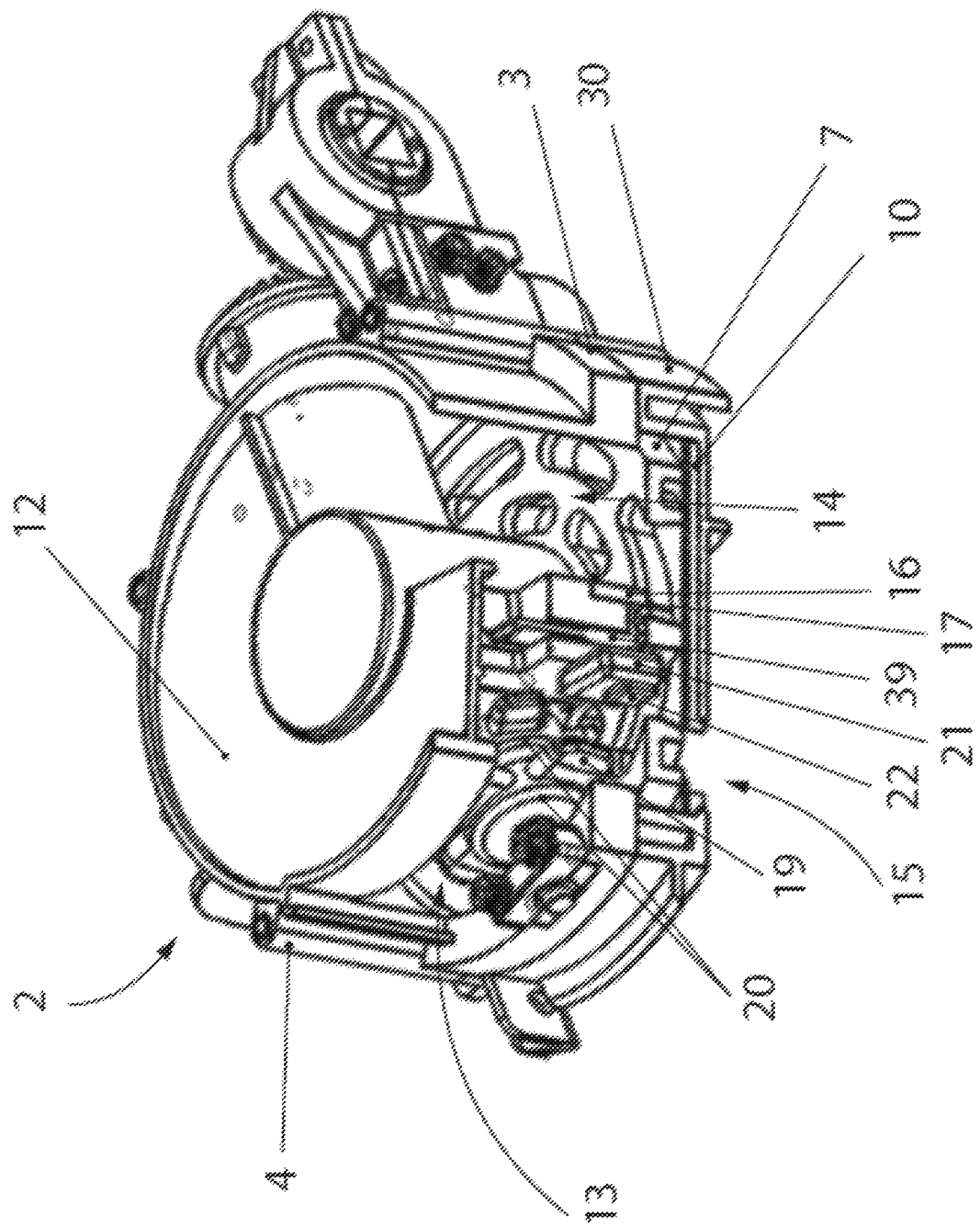
FIG. 5 shows a sectional perspective view of an embodiment of the meter.

The insulation barrier 12 is shown in more detail in FIGS. 4, 5 and 10, and specifically in FIG. 4, the meter is illustrated in a top sectional perspective view from above insulation barrier 12. The two main functions of the insulation barrier 12 are to separate loading chamber 6 from insulation chamber 13 and to control the weight of the material to be metered arriving at the rotating metering disk 7.

FIG. 5 shows a section of the meter 1 in which insulation chamber 13, metering bulkhead 16, the anti-skip bulkhead 39, the metering sensor 21, the metering circuit 22, the inlet region of disk 14, and the output region of the disk 15 can be observed.

The inlet region of disk 14 is, more specifically, the area in which the material to be metered is received from loading chamber 6 and is deposited on the rotating metering disk 7. At the inlet region of disk 14 of the material fills in, by gravity, the metering orifices 18 which exit empty from the insulation chamber as the disk 7 rotates towards metering bulkhead 16.

The rotation movement of the disk 7 is given by a means of transmission, with several types of drives being provided, such as for example mechanical hydraulic or electric, yet several types of transmission couplings are possible that can be applied in the meter of the present disclosure such as, for example, gears, pulleys, belts, chains, and flexible shafts, among others.

Still referring to FIG. 5, the metering bulkhead 16 is illustrated in an embodiment, in which it is secured to the insulation barrier 12, being that the lower portion 17 of metering bulkhead 16 is arranged on the rotatable metering disk 7 tangentially, i.e., the lower portion 17 of metering bulkhead 16 is arranged in the same plane of receiving surface 8 of disk 7 so as to ensure that only the material contained in orifices 18 pass to the side of the exit region of disk 15. The metering bulkhead 16 is may be used to ensure accuracy in the volume of material in the interior of orifices 18 of disk 7.

The material to be metered that does not enter orifices 18 and reach the bulkhead of metering 16 may be retained in the inlet region of the disk 14 and may recirculate until it is metered by lodging itself within one of orifices 18.

In an embodiment of the disclosure, the metering bulkhead comprises rigid material with high resistance to abrasion (e.g., stainless steel), mainly because of the corrosive and abrasive action of the fertilizer grains.

In another embodiment of the disclosure, the metering bulkhead is of flexible material, for example but not limited to a malleable polymer or spring steel. Such flexible material may be used, for example, in the case of metering of small seeds, in order to reduce or eliminate damage to (e.g., breaking of) the seeds.

In view of the possibility of choosing the metering bulkhead 16 according to the input to be metered, the metering bulkhead 16 of the present disclosure may be interchangeable, including a quick coupling mechanism to removably couple the metering bulkhead 16 with the meter 1 to allow agility in the exchange according to demand.

In the direction of rotation of the disk 7, after passing through the metering bulkhead 16, the metering orifices 18 pass under an anti-skip bulkhead 39 that has a function of preventing the material from leaving orifices 18 on the side of the receiving surface 8.

The arrangement of metering bulkhead 16 in conjunction with the anti-skip bulkhead 39 may improve the accuracy of the volume of fertilizer within metering orifices 18 so that the volume of fertilizer to be delivered by orifice 18 is the same as the total volume capacity of each orifice 18, thus being a known, predefined volume.

In an embodiment, following the rotation sequence of the disk 7, the orifices 18 may pass under a metering sensor 21. The metering sensor 21 has the function of monitoring orifices 18 to check the volumetric proportion within orifices 18.

The metering sensor 21 may be able to sweep the surface of disk 7 and of the orifices 18 and detect the volumetric proportion of each orifice 18. In this way, the surface scan allows a reading of the surface of the material within orifices 18, being a regular or irregular surface, to then indicate a precise volume of the material in each orifice 18.

Furthermore, with the indication of the volume of the material per orifice and based on the density of the material being metered, the mass of material being distributed by meter may be obtained with precision.

Alternatively, the electronic monitoring system of the present disclosure may be used in other meters, other than by horizontal rotating disks, such as, but not limited to, vertical rotating systems and other horizontal diskless systems such as, for example, using rods or flaps, provided that such systems provide regions where the sensors can read surfaces relative to predetermined volumes.

Figure 6:
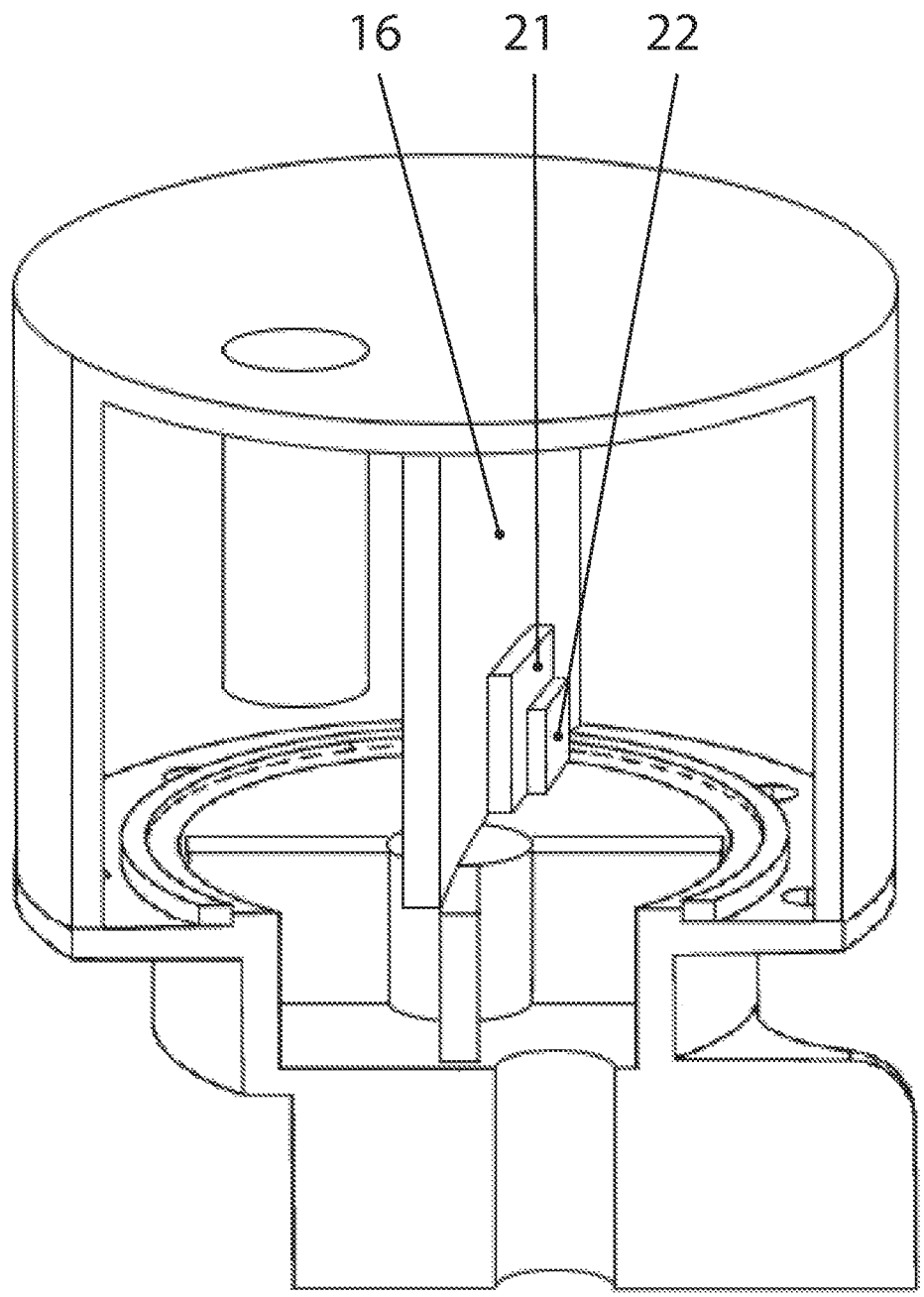
FIG. 6 shows a schematic view of an arrangement of the monitoring system of the disclosure.

FIG. 6 illustrates one of the embodiments of the metering monitoring system of the present disclosure applied in horizontal rotating systems with flaps. In this figure one can observe that the metering sensor 21 may be disposed after the metering bulkhead 16 and above the receiving surface of material in which the fins are rotated.

Figure 7:
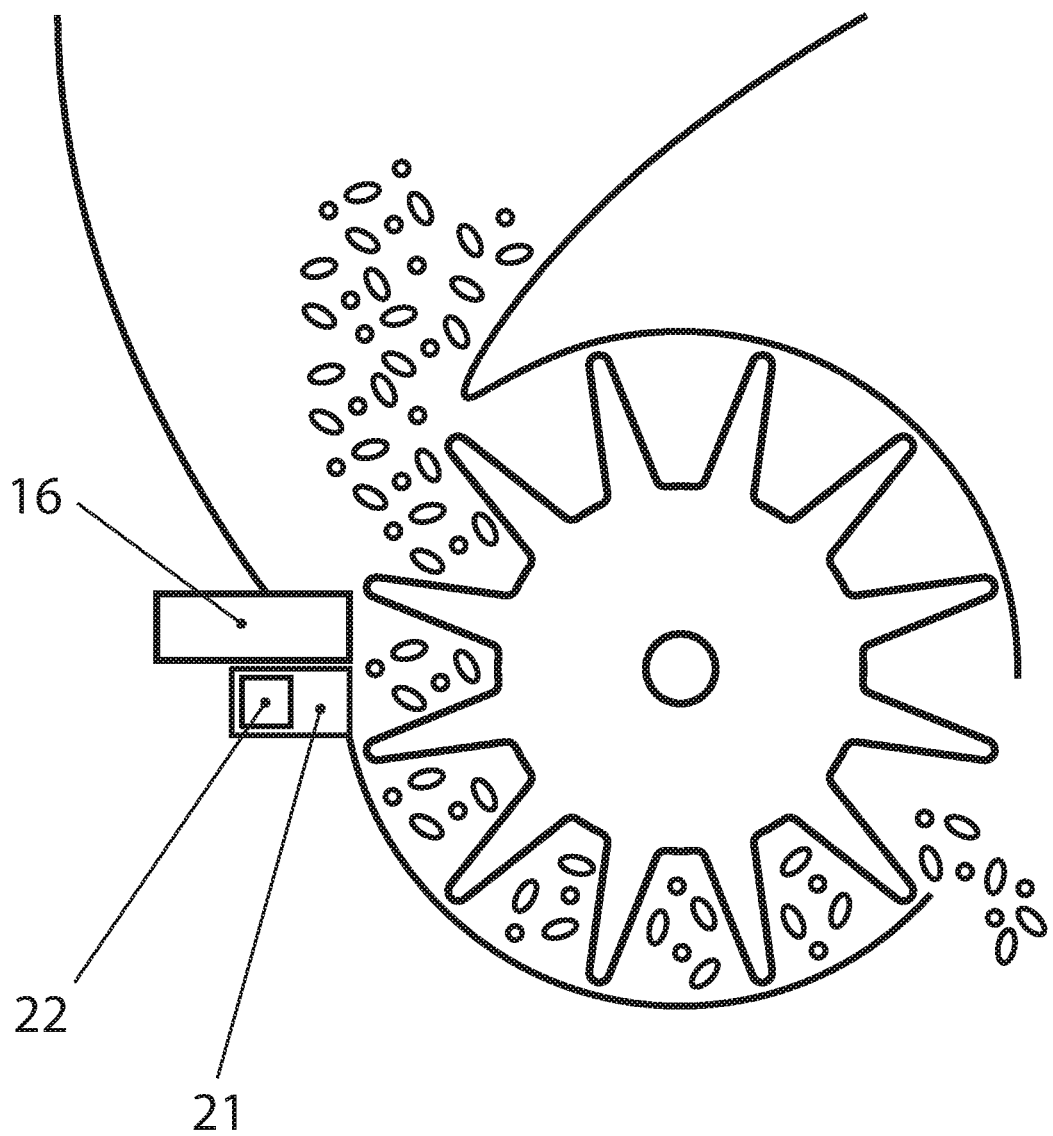
FIG. 7 shows a schematic view of another arrangement of the monitoring system of the disclosure.
Figure 8:
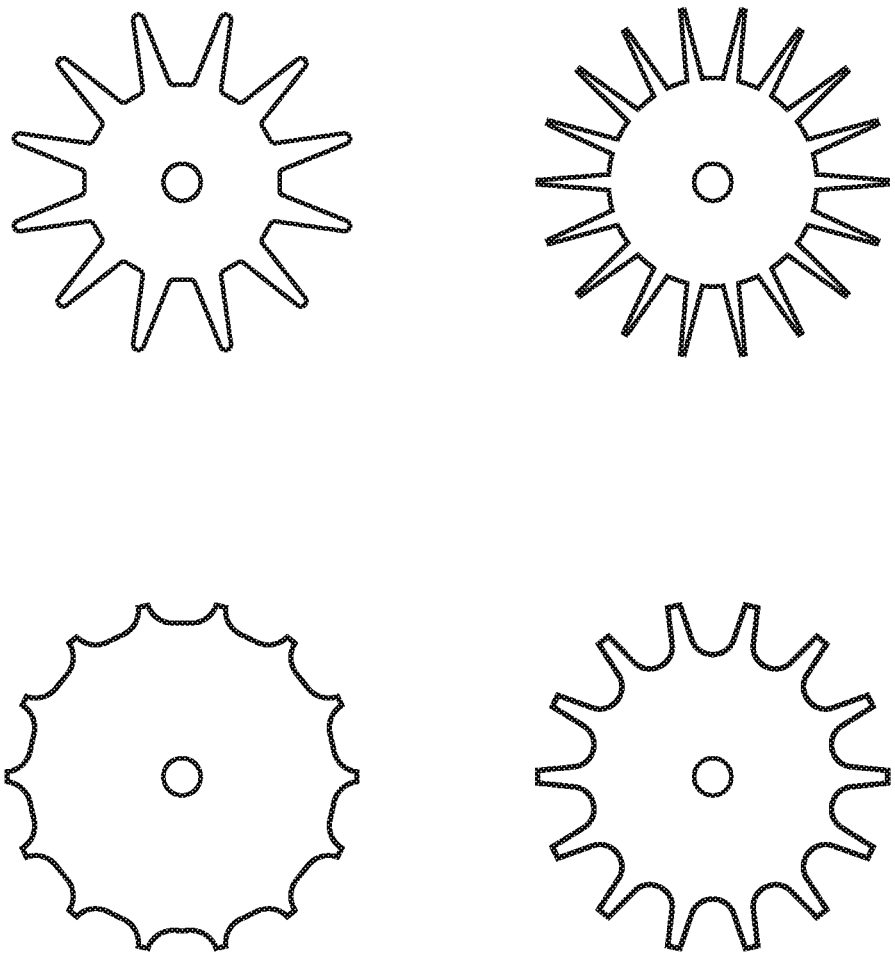
FIG. 8 shows vertical rotor profiles suitable for the system for monitoring the disclosure.

Another embodiment of the metering monitoring system of the present disclosure is applied in vertical rotating systems as illustrated exemplarily in FIG. 7. In FIG. 7, it can be seen that metering sensor 21 may be disposed radially on the receiving surface of a metering rotor and after the metering bulkhead 16, in the direction of the rotor movement. FIG. 8 shows the profile of some of the rotor embodiments suitable for enabling the use of the monitoring system of the disclosure.

The metering sensor 21 for detecting the volumetric proportion may be, for example, one of an optical sensor, ultrasound sensor, microwave sensor, capacitive sensor, proximity sensor, or contact sensor. Those skilled in the art will appreciate that the application of any other technology that provides an accurate measurement of the volume contained in the orifices can be applied.

The arrangement of the metering sensor 21 associated with a metering circuit 22 makes it possible to process and generate a signal representative of the detected proportion, which may be transmitted by a metering circuit 22 to a monitoring and control center (not illustrated).

The monitoring and control center may be remotely disposed to the meter and can be located, for example, in the tractor cabin or other agricultural implement. Based on the information received remotely (e.g., wirelessly or by wired connection), from the meters and other data sources such as GPS and other external instruments, such as densimeters and speedometers, the center can accurately calculate the exact mass of inputs distributed per hectare throughout the lines.

Figure 9:
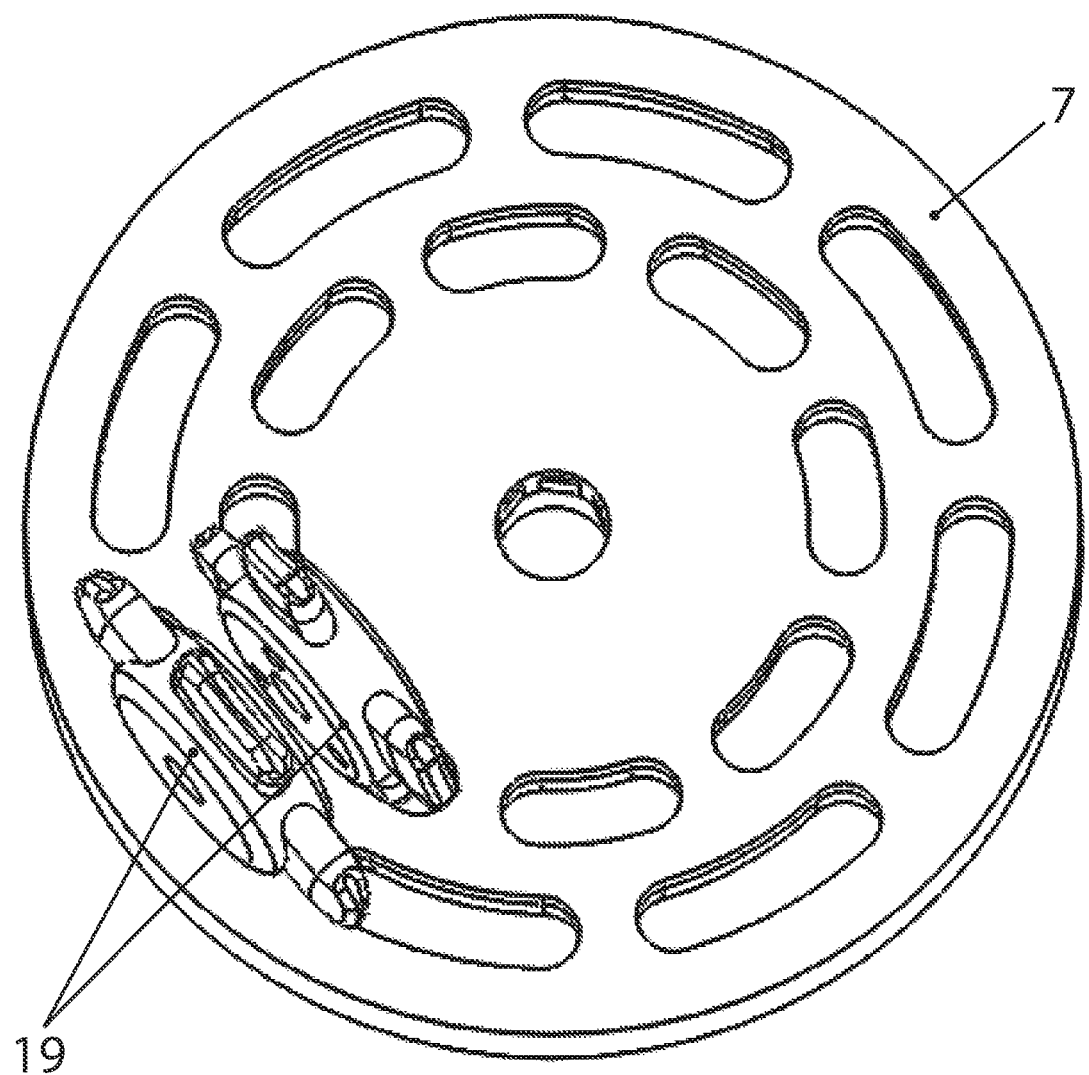
FIG. 9 shows a top view of an embodiment of the disk of the disclosure, with ejectors in an operative position.

The present disclosure also provides ejectors 19, as illustrated in perspective in FIG. 5 and in top view on disk 7 in FIG. 9. Ejectors 19 are disposed inside insulation chamber 13 on the rotary metering disk 7 and may rotate by mechanical action in synchronism with disk 7.

Particularly, ejectors 19 may have projections 20 with complementary shapes to the orifices 18 of metering disks 7 to ensure that the materials in the interior of orifices 18 which have not been discharged by gravity are expelled from the disk 7, by the side of surface 9, according to the rotation of the disk 7 causing projections 20 to be inserted into the orifices 18 by the side of receiving surface 8. FIG. 10 shows a side sectional view of the meter of the present disclosure, in which can be observed the insertion of projections 20 of one of the ejectors 19 into a respective one of the orifices of metering 18.

Alternatively, ejector 19 may include a flexible bristle brush, preferably of polymeric material, which penetrates into orifices 18 exerting a force on the material towards the discharge nozzle 23.

Figure 11:
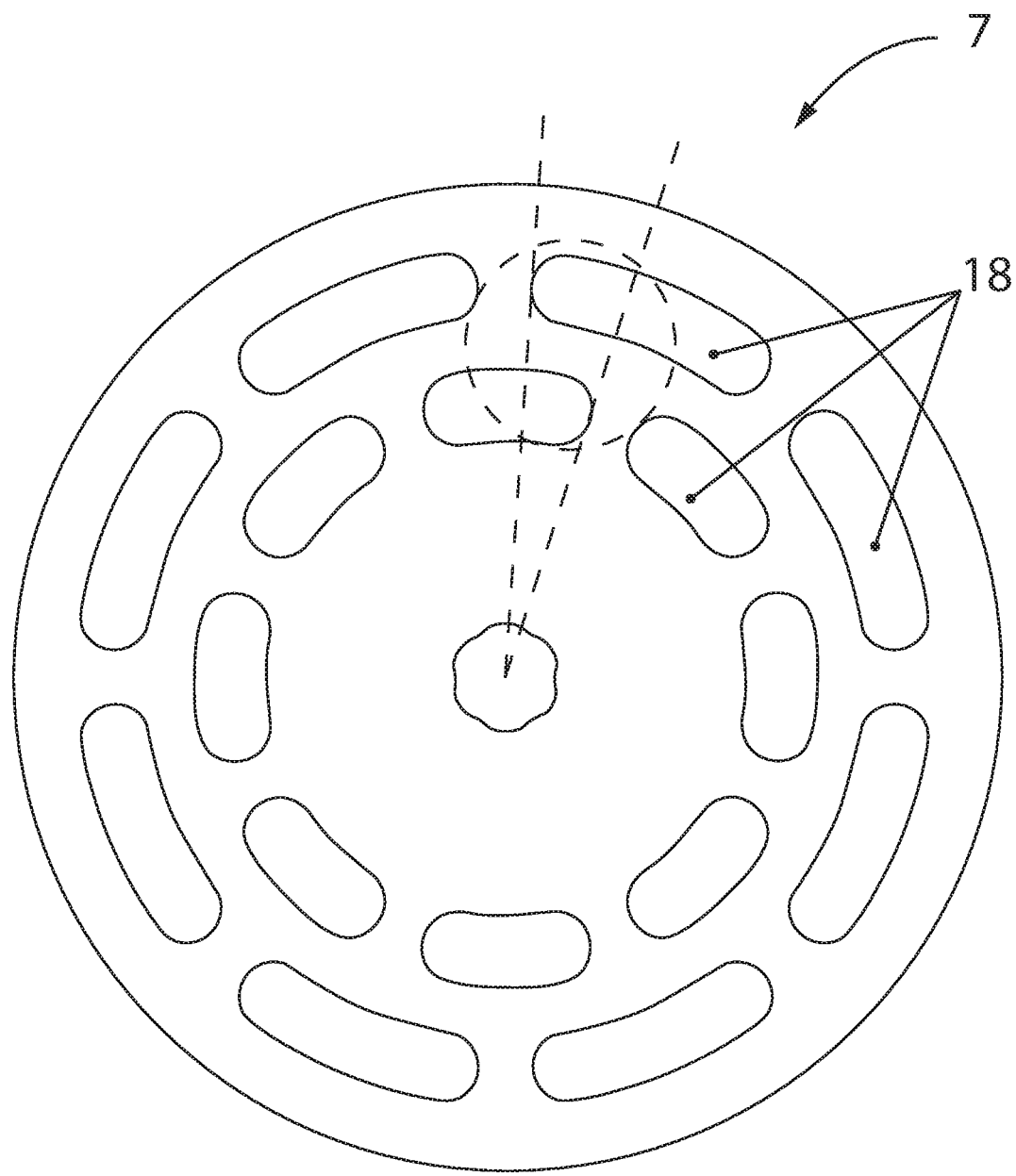
FIG. 11 shows a top view of a first embodiment of the disk of the disclosure.
Figure 12:
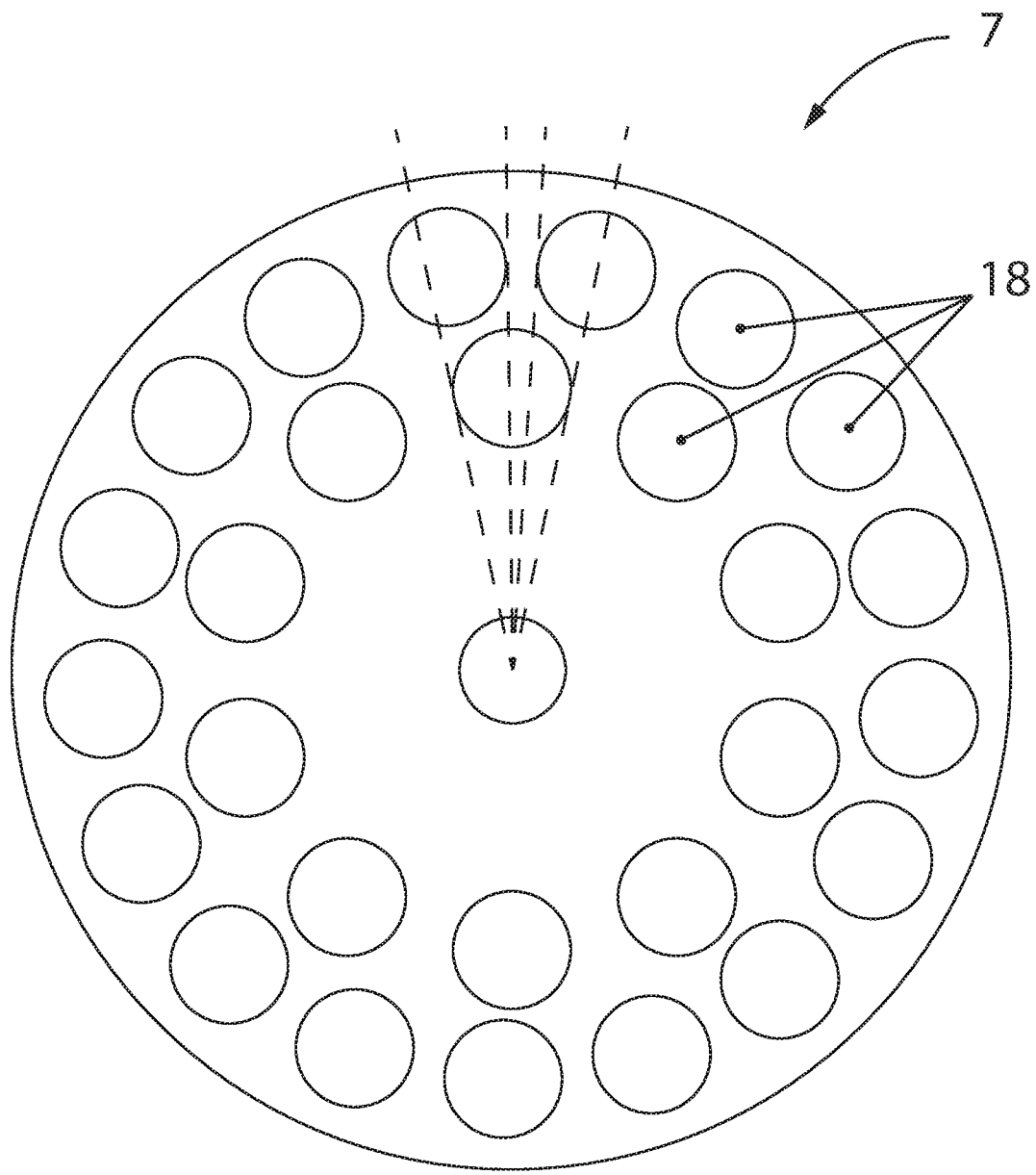
FIG. 12 shows a top view of a second embodiment of the disk of the disclosure.
Figure 13:
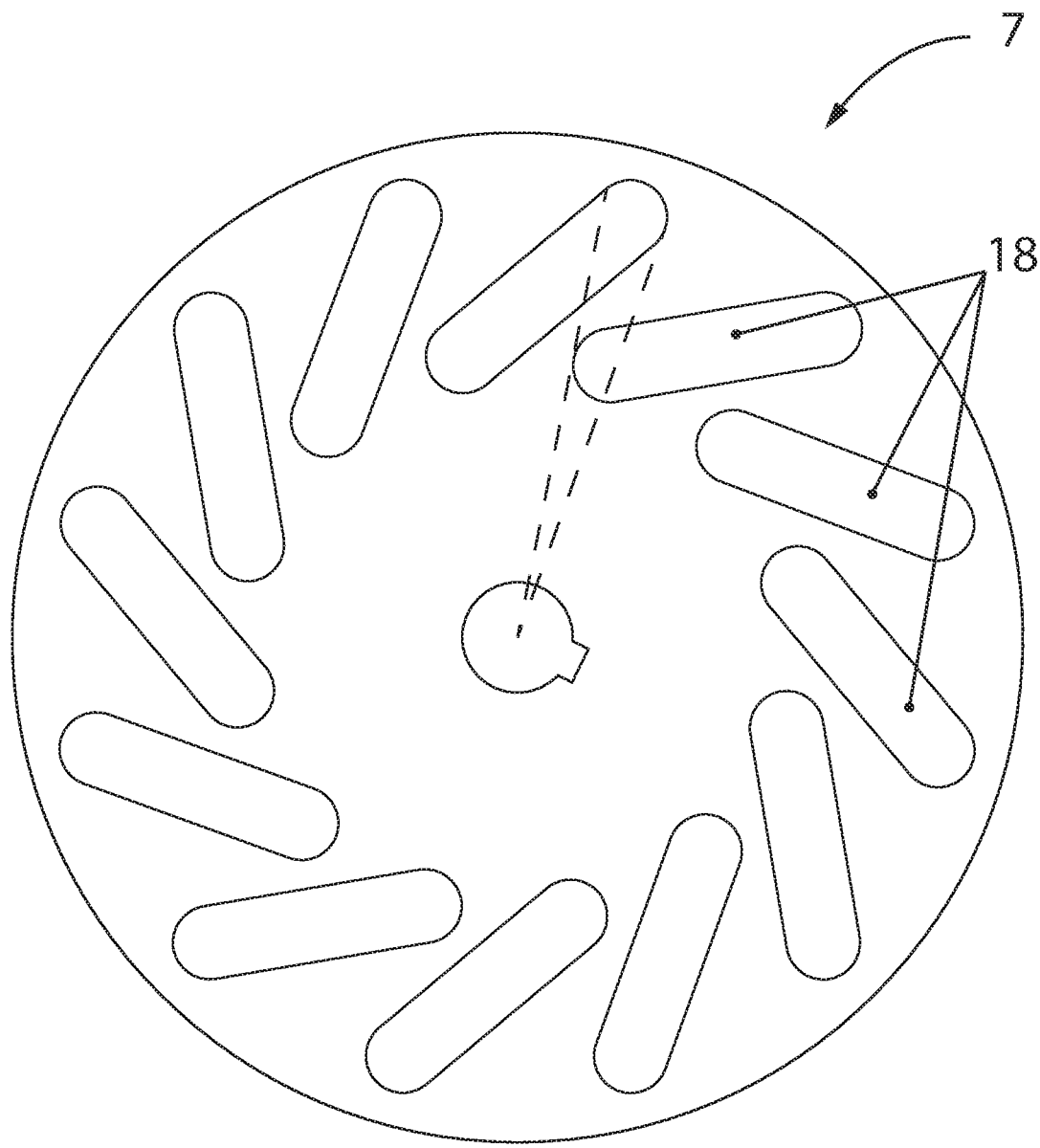
FIG. 13 shows a top view of a third embodiment of the disk of the disclosure.

FIGS. 11, 12, and 13 show three embodiments of disk 7 of the present disclosure. In FIG. 11, orifices 18 are substantially arranged radially in length in a radial direction and also with a radial curvature. In FIG. 12, orifices 18 are arranged in two rows. In FIG. 13, orifices 18 are obliquely arranged in an inclined manner.

The embodiments of disks 7 of FIGS. 11, 12, and 13 are exemplary and illustrate the technical principle which enables homogeneity in the metering and should not be construed as limiting, since those skilled in the art will appreciate that other geometries and arrangements are practicable to achieve the same technical effect. More specifically, FIGS. 11, 12, and 13 illustrate that adjacent orifices 18, whether laterally or radially, have areas of interference with each other which ensure that the equivalent volume of the metering orifices 18 on the discharge aperture 11 of ring 10 (FIG. 2) is constant as disk 7 rotates.

In other words, the interference regions refer to the arrangement of orifices 18 so that the volume gap due to the discrepancy of volume due to the interval spaces between the orifices and/or discrepancy generated by the geometry of the orifices is compensated by the adjacent orifices. The discharge of material may occur continuously because of the arrangement with interference geometry between the orifices. For example, an orifice posterior to the one being discharged, in the direction of rotation of disk 7, may start being discharged at the moment and proportionally to the moment in which the discharge of material of the orifice already in discharge is decreasing.

In one embodiment of the present disclosure, the disk 7 is arranged on ring 10 with a normal fit, i.e., without looseness between the surface of ring 10 and disk 7 to result in no granular material between these two components. This configuration may reduce or prevent the granular material from locking the system and/or causing premature wear of the components.

Further, ring 10 may be composed of two layers of material, the lower layer being made of plastic material, such as nylon with glass fiber or polyacetal, and the upper layer, which is in contact with the disk 7, of high abrasion-resistant material such as stainless steel, aluminum, or cast iron, for example.

Alternatively, the meter can operate without the use of a ring 10, as described above, in which case disk 7 may rotate directly on counterbase 30.

Figure 14:
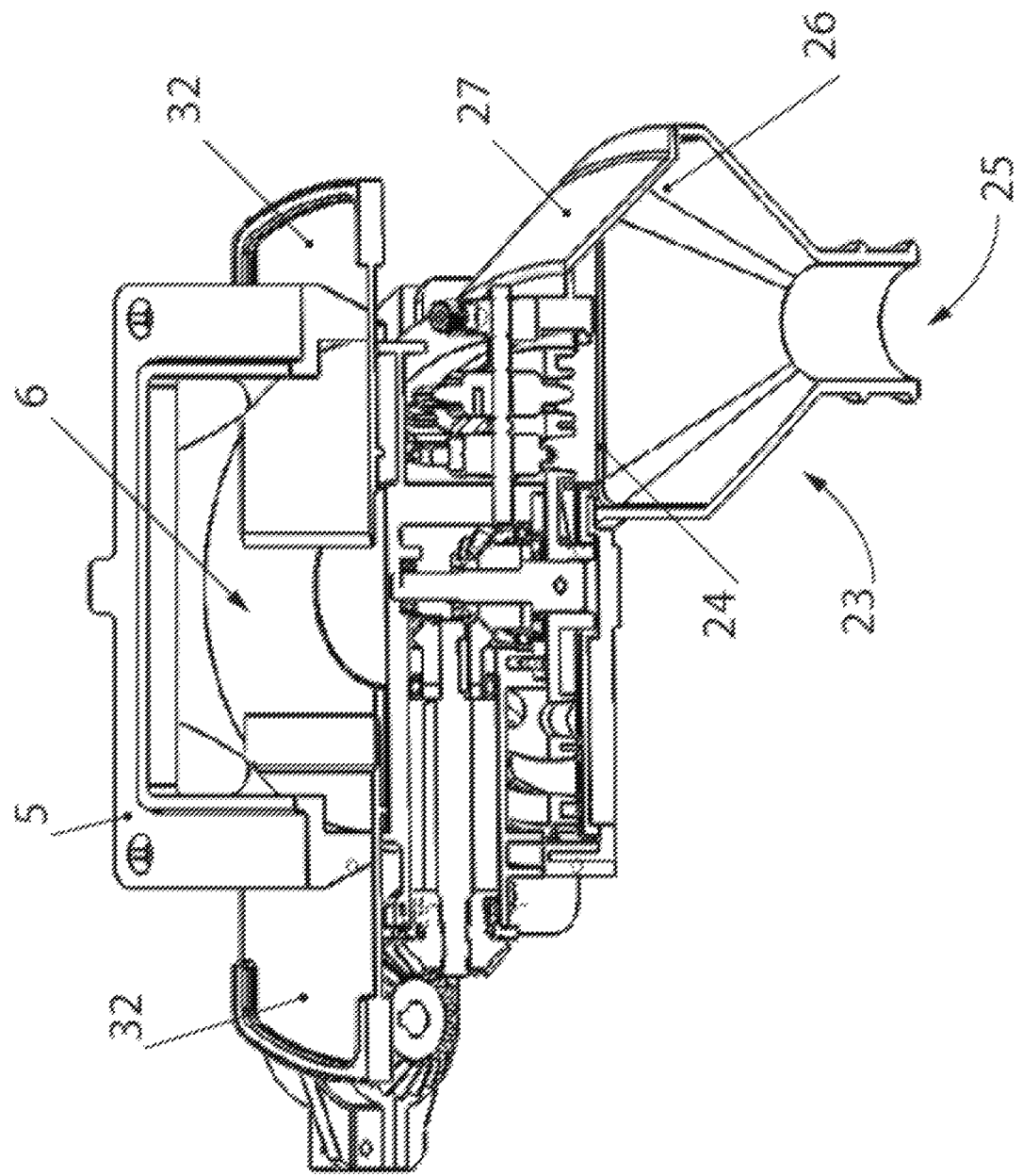
FIG. 14 shows a cross-sectional side perspective view of an embodiment of the disclosure.

FIG. 14 shows a left side and top perspective sectional view of an embodiment of the disclosure in which the discharge nozzle 23 composing the clogging monitoring system can be observed. Discharge nozzle 23 has an upper aperture 24, whereby the material to be metered is received from the discharge aperture 11 of the ring 10, a lower aperture 25, which is connected to a hose (not illustrated) through which the material passes and is deposited in the soil, and an overflow aperture 26.

In some embodiments, the overflow aperture 26 may be provided with a cap 27 that may be pivotally secured to the upper portion of the overflow aperture 26 so that, in the case of clogging in the hose, the material pushes and opens cap 27 and falls out of the discharge nozzle 23, preventing the material from returning through the upper aperture 24 and reaching the discharge surface 9 of the disk 7.

This embodiment may help reduce or prevent recirculation of already metered material into the orifices 18 and even into the insulation chamber 13 from occurring. The presence and configuration of the overflow aperture may also reduce or prevent premature wear or even more critical damage to the meter, such as in the disk 7, ring 10, and other elements inside the insulation chamber 13, as for example on the ejector 19 and the metering sensor 21, that might occur upon recirculation of already metered material.

Figure 15:
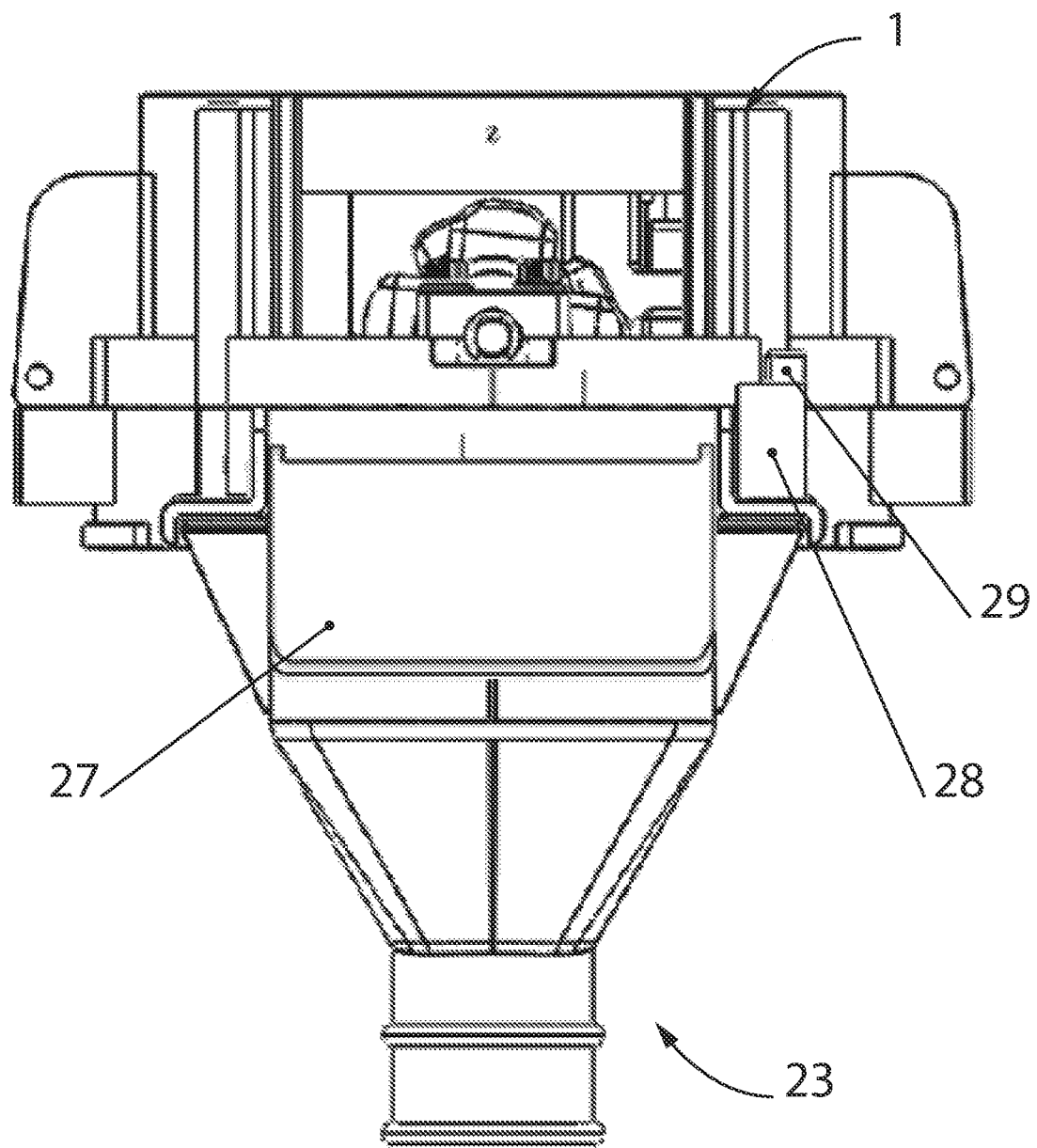
FIG. 15 shows a front view of an embodiment of the disclosure.

The lid 27 of the overflow aperture 26 may be or include a transparent material, in which case it may be used by the user (e.g., a farmer) to visualize the material being effectively metered inside of the hose. Furthermore, in an embodiment of the present disclosure, illustrated in FIG. 15, cap 27 is associated with clogging sensor 28 for the purpose of detecting the aperture of the cap 27 and, by means of a clogging circuit 29, transmitting an indication of lid status to a monitoring and control unit (not shown).

As will be apparent to those skilled in the art, the clogging sensor 28 need not to be associated with cover 27 to detect an event of clogging, for example any sensor capable of detecting the passage of material through the overflow aperture 26 can be used.

Figure 16:
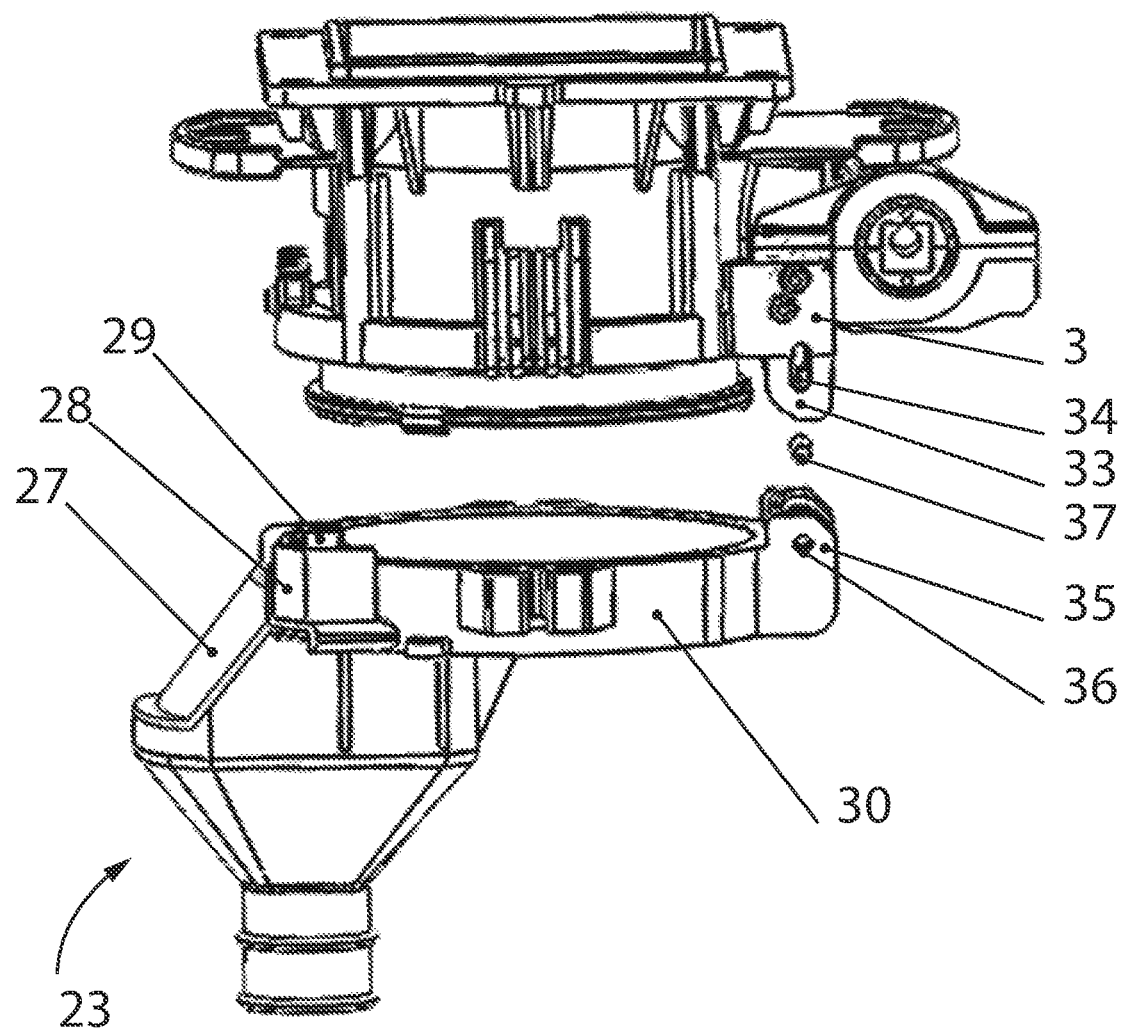
FIG. 16 shows an exploded side view of the means of the base and counterbase fixation mechanism of an embodiment of the disclosure.
Figure 17:
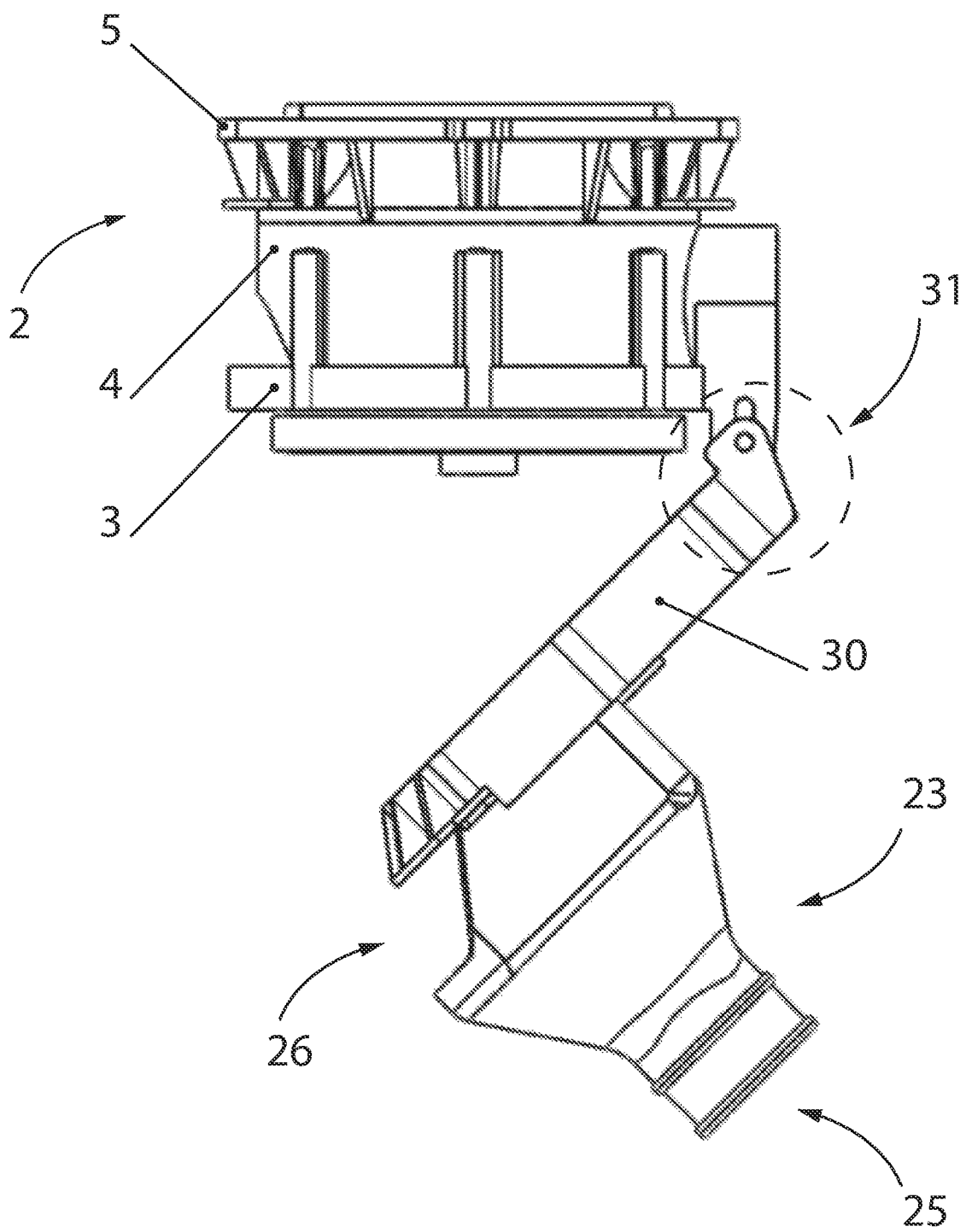
FIG. 17 shows a side view of an embodiment of the disclosure with the counterbase opened.

FIGS. 16 and 17 show an embodiment of the present disclosure in which counterbase 30 is separable from housing 2. In FIG. 16, there is an exploded view showing an example fixation mechanism 31, which provides for greater ease of maintenance of meter 1 of the present disclosure. The fixation mechanism 31 may be formed by shoulders 35 in the counterbase, the shoulders comprising apertures 36, and ears 33 in the housing, the ears comprising oblong apertures 34, shoulders 35 and ears 33 being warehouses so that the respective apertures 36 and oblong apertures 33 are aligned and are transfixed by rod 37.

The fixation mechanism 31 of the present disclosure allows the counterbase 30 to move vertically and rotate in the axis of the rod 37, as shown in FIG. 17. Such an arrangement may allow, upon opening of the meter, the counterbase 30 to travel in a downwardly linear movement and thereafter an angular movement so that it is possible to fit the disc-ring assembly at the same time as it allows coupling of disk 7 on the transmission axle.

In addition, this form of aperture is required for maintenance and exchange of internal elements such as disk 7, ring 10, ejector 19, insulation barrier 12, metering bulkhead 16, anti-skip bulkhead 39, and metering sensors 21, among other elements.

Further, a closure mechanism 32 may block an inlet of the load chamber 6, such as to enable maintenance of meter 1 without it being necessary to drain all of the material from the reservoir coupled to meter 1 and withdraw it from the agricultural implement.

In one embodiment, the closure mechanism 32 may include two horizontal movement plates, as shown in FIGS. 1, 2, 14, 16 and 18. In this embodiment, the two plates are displaced against each other until they are inside of the upper portion inlet 5 of meter 1, to, then, block the passage of material into the loading chamber 6.

In a laboratory evaluation of the disclosed system, the coefficients of variation of the fertilizer mass samples as a function of the slopes were 1.14% and 1.86% in the longitudinal and transverse slopes, respectively. Thus, it is concluded that mechanically this meter may provide a more homogeneous fertilizer mass distribution, regardless of the topographical irregularities, unlike the other known products. Associating this mechanical characteristic with electronic sensing improves the precision of the product and provides a desirable technological advance.

Thus, on the basis of their unique characteristics, some embodiments of the present disclosure achieve certain advantages and improvements.

In view of the foregoing, some embodiments of the present disclosure may provide a particulate material meter, such as a precision meter for fertilizer, small seed, and/or granulated chemicals.

Some embodiments of the present disclosure may provide for metering of the particulate material regardless of the topographical conditions of the terrain and/or movement and inclination of the meter relative to the soil, in other words, to maintain metering accuracy even in irregular terrain that may exert abrupt movements in the meter and/or on steep slopes.

Furthermore, some embodiments of the present disclosure may provide a meter which provides a homogeneous metering, i.e., constant metering without intermittences.

Some embodiments of the present disclosure may be used to monitor and control the metering volume of particulate material to be delivered at the meter outlet.

Some embodiments of the present disclosure may provide efficient means for maintaining the meter.

Embodiments of the present disclosure, by way of its own characteristics, may further solve other problems not recited here as examples, since the list discussed herein of particulate material meters and their problems are exemplary and not exhaustive.

This disclosure arises with the intention of providing a mechanically precise metering and also, with the aid of electronics, to enable the monitoring and control of the mass of fertilizer during the distribution.

While the disclosure has been specifically described with respect to particular embodiments, it should be understood that variations and modifications will be apparent to those skilled in the art and may be made without departing from the scope of protection of the present disclosure. Accordingly, the scope of protection is not limited to the embodiments described, but is limited only by the attached claims, the scope of which includes all equivalents.

What is claimed is:

1. A monitoring system of metering of fertilizers, seeds, and chemical products, comprising:
    a metering means including metering spaces with a predefined volume;
    a metering bulkhead positioned adjacent to the metering means, relative to which at least a portion of the metering means is movable, the metering bulkhead configured to define a volume of material in the metering spaces of the metering means;
    a metering sensor arranged after the metering bulkhead in a direction of movement of the portion of the metering means, the metering sensor configured to sense a volumetric proportion within the metering spaces of the metering means; and
    a circuit associated with the metering sensor, the circuit comprising data processing and transmission means.

2. The monitoring system of claim 1, wherein the metering means including the metering spaces with the predefined volume comprises:
    a rotatable metering disk comprising a receiving surface, a discharge surface, and the metering spaces including metering orifices with predetermined volumes, wherein the metering orifices pass from the receiving surface to the discharge surface; and
    an insulation chamber arranged on at least a portion of the rotatable metering disk and defining an inlet region of the rotatable metering disk for the loading of the metering orifices and an outlet region of the rotatable metering disk for discharging of the metering orifices;
    wherein the metering bulkhead is associated with the inlet region of the rotatable metering disk, the metering bulkhead being arranged over the rotatable metering disk such that a lower portion of the metering bulkhead is coplanar with the receiving surface of the rotatable metering disk.

3. The monitoring system of claim 1, wherein the metering sensor comprises at least one of an optical sensor, ultrasonic sensor, microwave sensor, capacitive sensor, proximity sensor, or contact sensor.

4. A monitoring method for the metering of fertilizers, small seeds, and chemicals, comprising:

monitoring a metering means including metering spaces having a predetermined volume with a metering sensor positioned rotatably after a metering bulkhead positioned adjacent to the metering means to delimit a maximum height of material to be metered in the metering spaces of the metering means, wherein at least a portion of the metering means is movable relative to the metering bulkhead;

generating a status signal of the metering means including a volumetric proportion within the metering spaces of the metering means;

processing the status signal of the metering means with a circuit associated with the metering sensor, the circuit including data processing and transmission means; and transmitting the status signal of the metering means to a monitoring and control center.

* * * * *